United States Patent [19]
Johnson

[11] Patent Number: 4,957,323
[45] Date of Patent: Sep. 18, 1990

[54] TRAILER WITH PORTABLE TOILET FACILITIES

[75] Inventor: David H. Johnson, Nappanee, Ind.

[73] Assignee: Commercial Structures, Inc., South Bend, Ind.

[21] Appl. No.: 336,467

[22] Filed: Apr. 11, 1989

[51] Int. Cl.$^5$ .............................................. B60R 11/00
[52] U.S. Cl. .................................. 296/181; 296/37.1; 52/79.1
[58] Field of Search .................... 296/181, 37.1; 52/27, 52/79.1

[56] References Cited

U.S. PATENT DOCUMENTS 4,776,631 10/1988 Sargent et al. ...................... 296/156

Primary Examiner—Margaret A. Focarino
Assistant Examiner—Andrew C. Pike

[57] ABSTRACT

An office trailer is disclosed which includes a recess or cove formed in one side wall. A portable toilet is accommodated within the cove and is transportable with the trailer to a use site.

3 Claims, 2 Drawing Sheets

TRAILER WITH PORTABLE TOILET FACILITIES

DESCRIPTION OF THE PRIOR ART

This invention relates to a trailer and will have application to a trailer having portable toilet facilities.

In the construction industry it is common for the contractor and sub-contractors to require an enclosed building or trailer to act as their offices during construction of the project. It is further common in the building industry to have a portable toilet facility on the construction site for the convenience of the construction workers.

Heretofore, the contractors were required to pull a trailer to the construction site to act as their offices and to also carry a separate portable toilet facility for the use and convenience of the construction workers. The portable toilet was generally carried to the site in the bed of a pick-up truck or separate trailer. Carrying the portable toilet on a pick-up truck bed is quite cumbersome and can be dangerous if the toilet was not tied down properly or shifts during transit.

SUMMARY OF THE INVENTION

This invention eliminates the problems previously experienced by providing a portable office trailer having a cove formed in one side wall of the trailer in which a portable toilet is retained for transportation to the construction site. The toilet is supported atop a grid attached to the trailer frame which prevents the collection of snow, ice or rain in the cove. The portable toilet may be fitted with electrical heaters or lights powered by an electric cord connected to an electric outlet on the exterior of the office.

Accordingly, it is an object of this invention to provide a novel trailer construction.

Another object of this invention is to provide for a trailer which accommodates a portable toilet facility therein for transportation of the toilet facility with the trailer.

Other objects of this invention will become apparent upon a reading of the following description taken with the accompanying drawings.

DETAILED DESCRIPTION OF THE PREFERRED EMBODIMENT

The preferred embodiment herein described is not intended to be exhaustive or to limit the application to the precise form disclosed. Rather it is chosen and described in order to illustrate the invention so that others skilled in the art can utilize its teachings.

Figure 1:
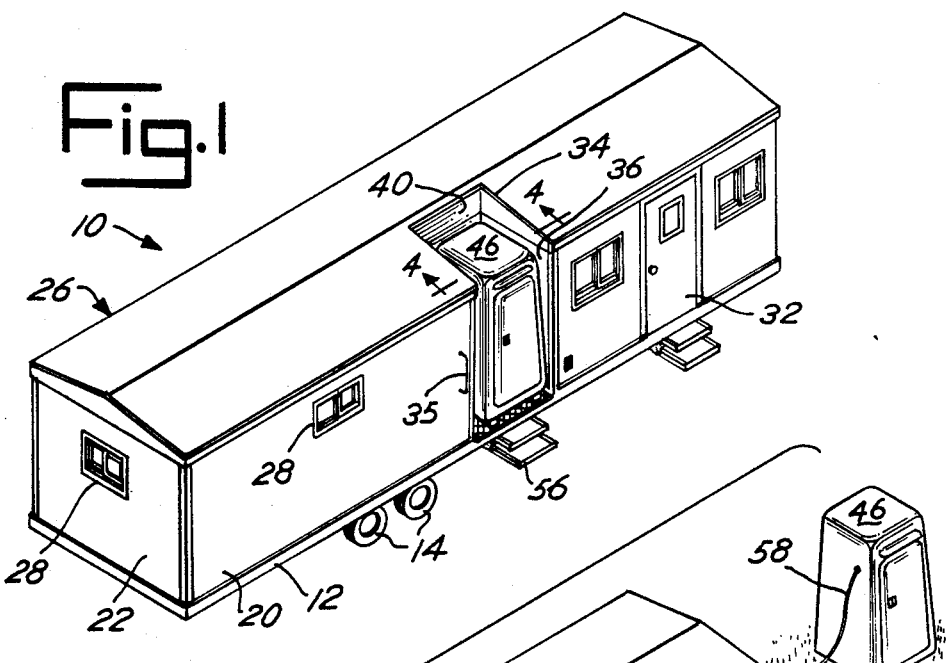
FIG. 1 is a perspective view of the trailer with the portable toilet in its stored position carried by the trailer.
Figure 2:
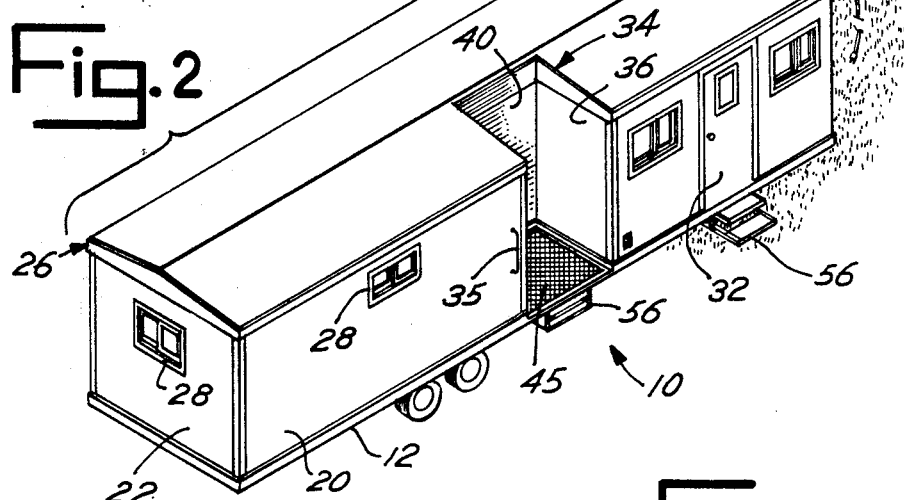
FIG. 2 is a perspective view of the trailer with the portable toilet removed prior to transportation to the building site.
Figure 3:
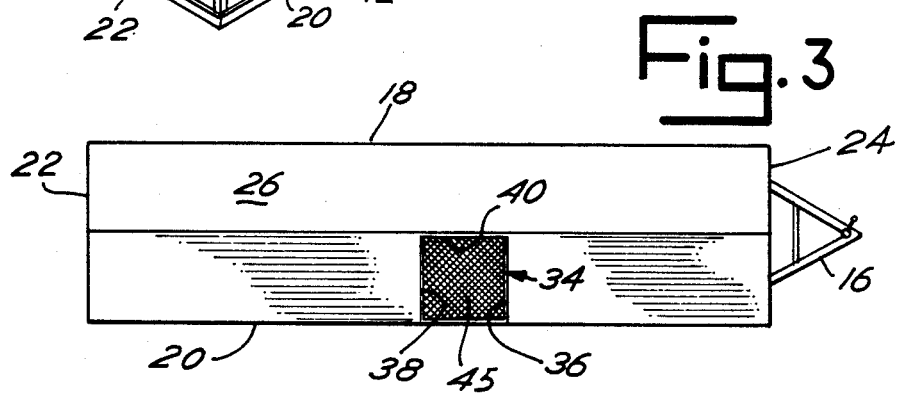
FIG. 3 is a top plan view of the trailer with the portable toilet removed.
Figure 4:
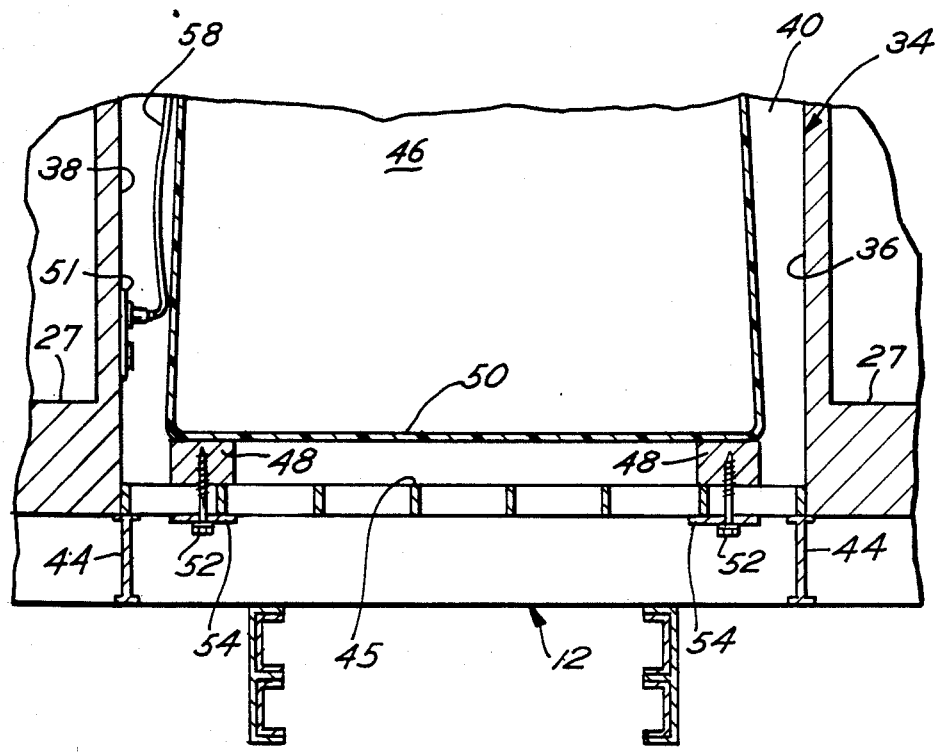
FIG. 4 is a fragmented cross-sectional view taken along lines 4—4 of FIG. 1.

Referring now to the drawings, FIG. 1 illustrates trailer 10 which, as is common in the industry, is supported by frame 12 having wheels 14 and a hitch tongue 16.

Trailer 10 includes side walls 18 and 20, end walls 22, a roof 26 and floor 27 to create an enclosed structure. A plurality of windows 28 may be provided in the trailer as desired. An entrance door 82 is provided in one side wall 20 to provide ingress and egress into the trailer 10.

A recess or cove 34 is formed in a side wall 20 and is defined by side wall partitions 36 and 38 interconnected by an end wall partition 40. Roof 26 is interrupted by cove 34. A metal grid 45 is connected to traverse beams 44 of trailer frame 12 and span the cove-created opening across wall partitions 36 and 88 thereby forming a continuation of the trailer floor 27. Grid 48 allows for the drainage of rain or snow from cove 84 to prevent water damage to trailer 10. A handle or grip 35 is attached to trailer side wall 20 adjacent the front opening into cove 34. Retractable steps 56 are attached to trailer frame 12 under grid 46 to provide access to toilet facility 46 when carried within cove 34.

Wall partitions 86 and 88 of cove 84 are sufficiently spaced apart so as to accommodate a portable toilet 46. Portable toilet 46 is of a design common in the industry and includes wooden skids 48 secured, to an outer side of a bottom wall 50 thereof to allow the toilet to be lifted and placed within cove 34 by a forklift or similar loading device.

For traveling purposes, portable toilet 46 is secured within cover 84 by a plurality of fastening devices such as lag bolts 52 which extend through grid 48 and into skids 48. A plate 54 is positioned between each head of the bolt 52 and grid 45 to span the grid opening and provide a contact surface for the fastening device. Trailer 10 with portable toilet 46 retained within cove 34 is then connected in a common manner to a towing vehicle (not shown) and pulled to the construction site. A removable strap may be used across the front opening in cove 84 to hold the toilet door closed and to add extra security during transport of the trailer. After arriving at the construction site, portable toilet 46 may be left in cove 34 with access being provided by retractable steps 56 attached to frame 12. Portable toilet 46 may be removed from the cove of trailer 10 by a forklift after bolts 52 are removed to flush and clean the toilet, or to use the toilet separately from the trailer. Toilet 46 sets well within cove 34 so a profile thereof does not protrude beyond the side wall of the trailer, thereby creating no hazard when the trailer with toilet carried within cove 34 is being towed.

If desired, electric heaters or electric lights (not shown) could be placed within the portable toilet facility and powered by an electrical cord 58 connected between the portable toilet 46 and an appropriate electrical outlet 51 located on the exterior of trailer 10.

It should be understood that the above invention is not to be limited to the above description but may be modified within the scope of the appended claims.

I claim:

1. In combination, a trailer and a portable toilet facility, wherein said trailer includes an enclosed structure having side walls and a supporting floor carried by a frame, one of said side walls having a recess defined therein, said portable toilet facility removably positioned within said side wall recess and supported by a portion of said trailer floor under said side wall recess, wherein said trailer includes a roof, said recess extending through said roof.

2. The combination of claim 1 wherein said trailer floor within said side wall recess includes grid means for supporting said portable toilet facility and providing drainage of moisture collected in said side wall recess.

3. The combination of claim 2 further including fastening means for retaining said portable toilet facility within said side wall recess.

* * * * *